Patented Oct. 27, 1953

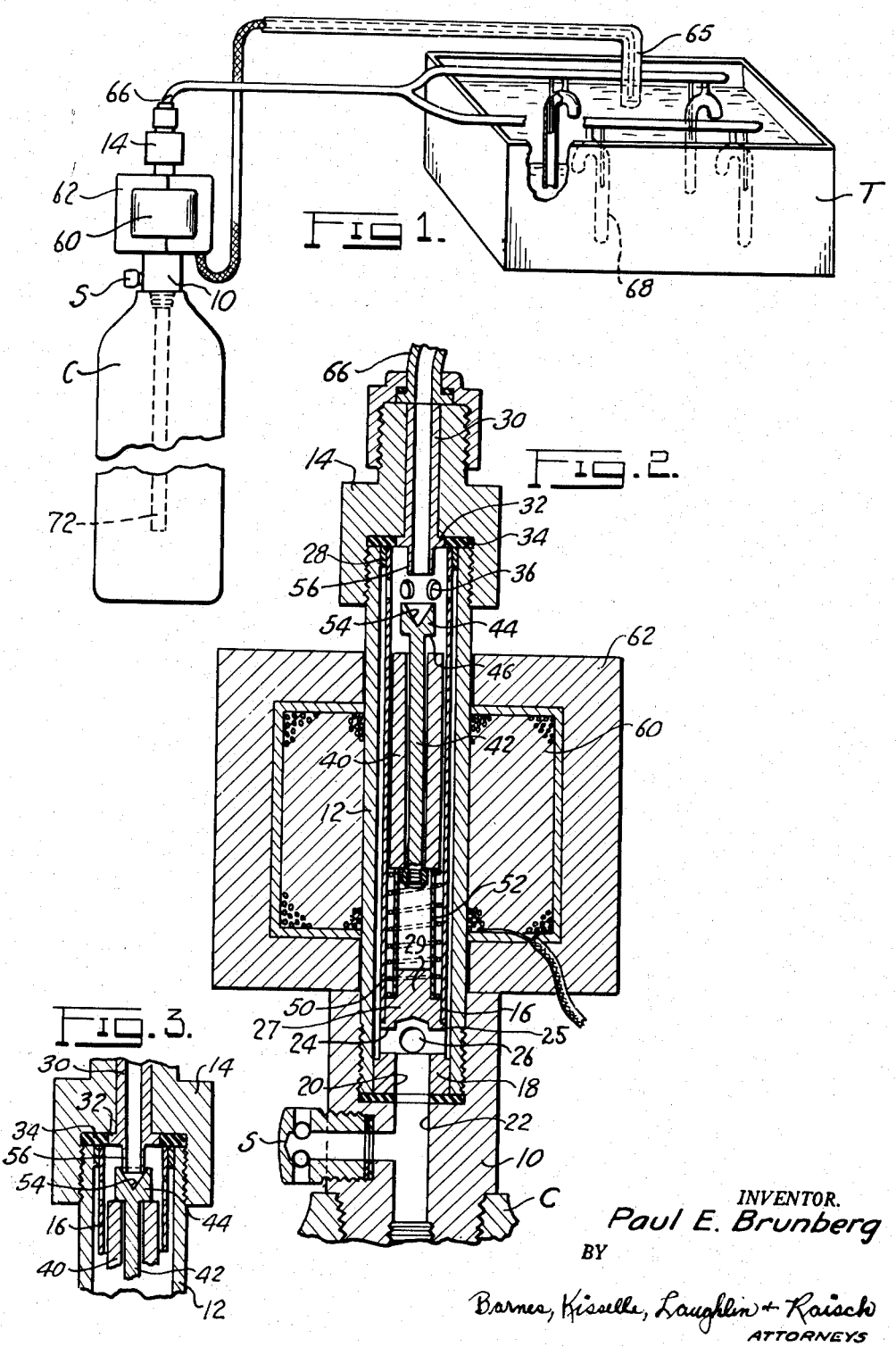

2,656,856

UNITED STATES PATENT OFFICE 2,656,856

GAS CONTROL VALVE

Paul E. Brunberg, Detroit, Mich., assignor, by mesne assignments, of one-half to Nita Carol Brunberg, Detroit, Mich.

Application January 15, 1949, Serial No. 71,114

3 Claims. (Cl. 137—702)

This invention relates to a gas control valve and has particularly to do with a control valve which can be used to regulate the egress of carbon dioxide gas from a container in which it is held under pressure.

The characteristics of gases under pressure and especially those that have been liquified have challenged the user of the same in that problems of freezing have to be controlled in distribution systems.

Among the common and most useful gases, carbon dioxide ($CO_2$) serves industry in a number of limited applications. Its unique triple properties that consist of gas, liquid or snow (Dry Ice) indicate an important industrial potential when control of each state is achieved.

Because of the properties, availability and relatively low cost of carbon dioxide its use in industrial applications has been limited only by the erratic behavior of the liquid upon discharge with a resultant tendency to freeze the conductors and particularly valve components.

The widest application for gases such as carbon dioxide comes from expansion of the liquid at a designated spot in predetermined quantities. One important use requiring a potential quantity of gas calculated to equal the present tonnage consumed in all other fields is disclosed in U. S. Patent 2,416,374, issued Feb. 25, 1947. Here the requirement is for liquid carbon dioxide to reach a designated spot before primary expansion begins, to continue its expansion until a complete metallurgical and refrigeration function has been performed.

The process referred to concerns the art of resistance welding. It deals with the successful welding of stainless steel—for example—without carbide precipitation, grain growth or scaling of the surface. In other words, the metal is stainless after welding.

A valve mechanism to accomplish the above is required to operate at speeds of 120 times per minute with open time being as little as $\frac{1}{12}$ second. The liquid must pass the seat of the valve and arrive at its destination as liquid.

The normal source of carbon dioxide may be the common 50 pound tank, converter (Dry Ice to liquid) or the liquid low temperature container. In the first two sources the liquid is at the bottom of the container in which a nominal quantity is gas in the top of the container. Accordingly, a syphon tube is normally placed in the gas container to make liquid available to the valve.

I have found that a system of ratios must be employed to transport the liquid through the valve without impacting the same with snow. Evidently, the "mean free path" of the molecules of liquid must be maintained to avoid a change of state during transportation.

The orifice of the valve shall preferably have a length at least 4 times the diameter and the supply source to the orifice shall have an area of five times the area of the orifice. Apparently, the back pressure sustained by the length of the orifice in relation to supply areas maintains a "mean free path" and permits no change of state until required upon release in an expansion chamber.

At high pressure, Boyle's law is not obeyed because of the lack of "free space" between molecules. Here a given increase in pressure does not result in a corresponding decrease in volume.

The means for carrying out the above objects as embodied in a valve is shown in the drawings in which:

Figure 1 is a general assembly view showing the valve attached to a gas container and leading to an oil quenching tank;

Figure 2 is a section view of a solenoid valve;

Figure 3 is a partial view showing the valve in closed position.

The valve shown in detailed section in Figure 2 has an inlet connection head 10 which can be fastened to the top of a container C in a threaded joint. A safety plug S is provided in the head 10 in accordance with standard construction.

The main body of the valve is a sleeve or tube 12 threaded at one end into the head 10 and capped at the other end by an outlet connection 14. Concentric within sleeve 12 is an inner tube 16 positioned at the lower end, as viewed in Figure 2, by a plug 18 having a dead end central bore 20 connecting with a bore 22 of head 10 and provided with cross bores 24 and 26 at a narrowed intermediate portion 25. A further reduction of the plug 18 at 27 fits the inside of the valve guide tube 16 to position the same concentric with sleeve 12. A ring 28 positions the tube 16 at the top end as viewed in Figure 2. Thus an approach or flow space is provided with an elongate annular shape and relatively thin in width at any one point.

A nipple liner 30 is provided in a bore of the outlet connection 14 and is provided with a radial flange 32 which locks the nipple in position against a washer 34 abutting the ends of the sleeve 12 and the tube 16. Just below the ring 28 holes 36 are provided connecting the passage between the sleeve 12 and the tube 16 with the inside of the tube 16. Slidable within tube 16 is a short iron rod 40 having an axial hole through which projects a stem 42 of a valve member 44. The rod 40 is slidable on the stem 42, the movement thereof being limited by a shoulder 46 on the valve member 44 and a nut threaded on to the end of stem 42. Preferably the end of the stem 42 is peened over to lock the nut in place.

A spring 50 bears against the end of rod 40 to urge the valve 44 to a closed position. A guide sleeve 52 supported on the end 29 of plug 18, reduced from the portion 27, serves also as a stop for the rod 40 as the valve moves toward open position. The end of the valve member 44 has a cone-shaped opening 54 which cooperates with a circular projecting end 56 of the nipple 30. In closed position the outer annular edge of the projection 56 seats in the conical walls of the opening 54. (See Fig. 3.) A solenoid winding 60 surrounds sleeve 12 and solenoid iron 62 in the form of C plates is provided on opposite sides of the solenoid. A suitable casing can enclose the valve and the plates.

The dimensions of the valve are critical in some respects. It has been found that the orifice of the valve, that is, the nipple 30, should have a length at least four times its diameter and that the supply source to the orifice, that is, the area of the concentric and annular space between sleeve 12 and tube 16, should be at least five times the area of the orifice. With these proportions the operation of the valve may be effected without the forming of solid carbon dioxide in the valve which would obstruct the parts and the passages. For example a valve with an outlet diameter of .120 inch and an approach space with O. D. $5/8''$, I. D. $9/16''$ gives an area ratio of approximately 1 to 5. It is desirable, also, to have the discharge orifice four times the diameter in length to create sufficient back pressure to avoid a drop in pressure within the valve chamber.

In operation when the solenoid is energized through proper lead wires and a suitable switch, the rod 40 is retracted into the field of the solenoid and the inertia created by the movement of the rod will open the valve 44 against the spring 50. Gas will then pass from passage 22 through cross passages 24 and 26 to the space between sleeve 12 and the tube 16 from which it reaches holes 36 and then exits through the nipple 30. When the solenoid is de-energized the spring 50 will cause valve 44 to move to a closed position and the valve will be held in closed position by pressure within the tube 16.

In the schematic drawing of Figure 1 the container C is shown locked near a tank T which may be a quenching tank filled with oil. Over this quenching tank is a thermostat 65 leading to the solenoid winding 60. The outlet connection 14 of the valve connects to a tube 66 leading to a carbon dioxide outlet 68 at the surface of the oil and tank T. These outlets can be in the form of the tube pumps which will prevent the carbon dioxide from blowing the oil out of the tank and still create turbulence and release the carbon dioxide at the surface of the tank. Thus any flash fires at the tank surface may be immediately extinguished. The tube pump 68 consists merely of an inverted candy cane shaped tube in which a smaller tube enters the rounded end and projects down into the leg of the tube.

It has been found in the operation of the described valve that there is no tendency for the valve to freeze up even with extremely rapid opening and closing operation. It will be understood that while the valve will control $CO_2$ gas directly, it will also valve liquid from the tank and many operations require that a siphon tube be inserted to pick up $CO^2$ in liquid form from the bottom of the tank. (See Fig. 1 at 72.) The valve will work equally well on the liquid form of a gas.

I claim:

1. A solenoid operated control valve comprising a main housing tube, an inlet plug in one end of said tube having one portion closing the end of the tube, a second narrowed portion having radial ports opening to the tube interior, a third narrowed portion and a fourth end portion of yet smaller diameter, an inner valve guide tube sleeved over said third portion to lie concentrically within and extending to the end of said outer housing tube, and a spring guide and valve stop portion sleeved over said end portion of said plug, means at the other end of said main housing tube extending radially to close the annular space between the concentric tubes and forming an outlet comprising an outlet tube projecting into said main tube centrally to form a valve seat, a valve member having a conical recess axially thereof adapted to enclose the projecting end of said outlet tube when in closed position, a stem on said valve extending into said inner tube, and a solenoid actuator for said valve comprising an iron rod around said stem slidable thereon, stops on said stem to limit the movement of said rod relative to said stem, and spring means between said rod and said plug urging the valve to closed position, said inner tube being apertured at the outlet end to admit gas from the space between the outer and inner tubes to said outlet seat.

2. A solenoid operated fluid control valve comprising two concentric tubes dimensioned to provide a flow space between the outer wall of the inner tube and the inner wall of the outer tube, means sealing said space at one end of said tubes and serving to admit gas to said space from an inlet connection, means sealing said space at the other end of said tubes and providing a restricted outlet from the inside of said inner tube, ports admitting gas from said space to the inside of said inner tube at the outlet end, means forming a sharp-edged circular projecting seat at the inner end of said outlet, a control valve comprising a head having a conical recess concentric with and dimensioned to receive said seat when in closed position, a solenoid winding around said concentric tubes and a piece of iron freely slidable around said valve within said inner tube to position said valve in line with said seat and engageable with said valve head to serve as a solenoid actuator.

3. A solenoid operated fluid control valve as defined in claim 2 in which the cross-sectional area of flow space is approximately five times that of the outlet.

PAUL E. BRUNBERG.

References Cited in the file of this patent

UNITED STATES PATENTS

| Number | Name | Date |
|---|---|---|
| 621,388 | Turnbull | Mar. 21, 1899 |
| 873,554 | Kadow et al. | Dec. 10, 1907 |
| 1,622,672 | Raymond | Mar. 29, 1927 |
| 1,640,324 | Hibbard | Aug. 23, 1927 |
| 1,648,273 | Hoffschneider | Nov. 8, 1927 |

FOREIGN PATENTS

| Number | Country | Date |
|---|---|---|
| 105,575 | Australia | of 1938 |